United States Patent Office 2,850,462
Patented Sept. 2, 1958

2,850,462

REACTIVATION OF METAL-POISONED CATALYSTS

Charles J. Plank, Woodbury, N. J., assignor to Socony Mobil Oil Company, Inc., a corporation of New York No Drawing. Application October 20, 1954
Serial No. 463,606

6 Claims. (Cl. 252—411)

This invention relates to a process for treating a catalytic composite useful in the conversion of higher boiling hydrocarbons to lower boiling hydrocarbons such as gasoline. More particularly, the present invention is concerned with a method for treating siliceous cracking catalysts poisoned by metal contaminants. The present invention is specifically directed to a method for reactivating siliceous cracking catalysts which have become poisoned during hydrocarbon conversion operations by the contaminating effects of minute amounts of nickel.

Siliceous cracking catalysts, including naturally occurring activated clays and synthetically prepared composites, have long been recognized as useful in catalytically promoting hydrocarbon conversion reactions. Such siliceous catalysts contain silica and one or more metal oxides. In clays, the metal oxide present is predominantly alumina. Active synthetic cracking catalysts are generally gels or gelatinous precipitates and include silica-alumina, silica-zirconia, silica-beryllia, and silica-magnesia, as well as ternary combinations such as silica-alumina-zirconia, silica-alumina-beryllia, and silica-alumina-magnesia. Ordinarily, this type of catalyst contains silica and at least one material selected from the group of alumina, zirconia, beryllia, and magnesia. Other metal oxides may also be present, if desired, generally in small percentage, such as those of manganese, chromium, titanium, tungsten, molydenum, and calcium. Synthetic siliceous cracking catalysts may be prepared by various well-known methods, such as by cogelation or co-precipitation of the silica and metal oxide, or by milling together the separately precipitated or gelled components. Alternatively, the metal oxide may be combined with a previously formed siliceous gel utilizing impregnation or base exchange techniques. The present invention, however, is not limited to catalysts prepared by any particular method but is of general application to siliceous cracking catalysts. It will thus be understood that the catalysts undergoing treatment in accordance with the present invention may be any of the siliceous cracking catalysts heretofore customarily employed, which are susceptible to poisoning by the presence of nickel contaminant. It will further be understood that the treatment described herein may be performed on metal-poisoned catalysts before the same have been used in hydrocarbon conversion or on metal-poisoned catalysts which have been previously utilized in promoting the conversion of hydrocarbons.

Commercial catalytic cracking is carried out by contacting a hydrocarbon charge in the vapor or liquid state with a catalyst of the foregoing type under conditions of temperature, pressure, and time to achieve substantial conversion of the charge to lower boiling hydrocarbons. This cracking reaction results in deposition of a carbonaceous deposit commonly called "coke" with consequent decline in catalytic activity of the catalyst. Under conditions to obtain efficient operation from a yield standpoint, it is found desirable to terminate the cracking reaction after a relatively short conversion run, for example, of from 5 to 15 minutes on stream, and thereafter to restore the activity of the catalyst by burning off the coke in a regeneration stage. The formation of coke represents a net loss, since hydrocarbons are consumed in its production. In addition, it is apparent that the greater the coke deposit, the longer the regeneration period would have to be in proportion to the on-stream period in order not to exceed detrimental temperature levels during regeneration.

Minute amounts of nickel are highly detrimental to the efficiency of the siliceous cracking catalysts above-described. Such catalysts, contaminated even with an extremely small amount of nickel, exhibit decreased activity and excessive coke formation during cracking reactions. In fact, commercial experience with such a poisoned catalyst shows about 50 percent more coke made by the catalyst at equilibrium activity than is produced by the catalyst in unpoisoned condition. Furthermore, since the major portion of the catalyst remains in the cracking system over an extended period of time with recirculation, the amount of nickel contaminant gradually builds up to such a point that further contact of the cracking charge with the catalyst becomes an uneconomical operation. The nickel contaminant may be introduced during preparation of the catalyst, or it may be introduced with the charge stock, or it may be eroded from the equipment. Regardless of its manner of introduction, the presence of nickel contaminant in the siliceous cracking catalyst employed is definitely detrimental, leading to the production of an excessive amount of coke.

The poisoning effects of minute amounts of nickel on siliceous cracking catalysts have heretofore been recognized in the art. Various techniques have been suggested to remove the nickel contaminant. In general, such techniques have involved rather drastic measures, including chemical attack on the nickel poison. In some cases, excessive heat treatment has been suggested for removing the nickel contaminant despite the danger of surface destruction in the catalyst due to sintering.

It is a major object of this invention to overcome the difficulties caused by the poisoning effects of nickel contaminant on the conversion efficiency of siliceous cracking catalysts. A more specific object is the provision of a method for reducing excessive coke formation on siliceous cracking catalysts contaminated with minute amounts of nickel without resorting to the drastic measures necessary to remove the nickel. A further object is to provide a process for reactivation of such contaminated catalyst.

The above and other objects which will be apparent to those skilled in the art are achieved by the process described herein. Broadly, the present invention involves treatment of a nickel-poisoned siliceous cracking catalyst by impregnating the same with alumina and subjecting the impregnated catalyst to a mild steam treatment. Such method of treatment, under conditions set forth hereinafter, has been found to completely deactivate the offending nickel contaminant, restoring the catalyst to a normal or better than normal gasoline to coke ratio.

The catalysts reactivated in accordance with the present invention include both synthetic and natural siliceous composites containing a major proportion of silica and a minor proportion of one or more metal oxides as described above. The catalysts treated in accordance with the present process are further characterized by the presence therein of a small amount of nickel contaminant. Generally a very minute amount of nickel, as low as 0.006 percent by weight of the catalytic composite, will exert a detrimental poisoning effect on the cracking characteristics of the described siliceous cracking catalysts. It is contemplated that such siliceous catalysts contaminated with nickel up to the extent of about 0.20 percent by weight may be effectively reactivated in accordance with the present process.

In practice of the invention, a nickel-poisoned siliceous cracking catalyst is impregnated with alumina. The impregnation may be carried out in any feasible manner and generally by contacting the poisoned catalyst with a solution of a soluble aluminum compound which decomposes to leave a residue corresponding substantially to alumina after calcination. The impregnation may be carried out either batchwise, in which case the catalyst is permitted to remain in contact with the impregnating solution under generally static conditions for a predetermined length of time and is then removed therefrom, or treatment may be effected by continuously percolating the impregnating solution through a bed of the catalyst. The deactivated catalyst may also be impregnated in situ by the addition of an oil-soluble aluminum compound to the charge stock, which lays down a deposit of alumina on the catalyst under the prevailing hydrocarbon conversion conditions, causing deactivation of the nickel poison as the charge stock is contacted with the catalyst. This latter method is particularly attractive from a commercial standpoint since it represents a method of reactivation which eliminates the need for unscheduled shut-downs, thereby realizing considerable economic advantages. In some cases, vaporous impregnation of the poisoned catalyst may be desirable. In such method, the poisoned catalyst is brought into contact with vapors of an aluminum compound which, upon subsequent calcinaton, will leave a residue of alumina.

The amount of alumina deposited on the nickel-poisoned catalyst and the conditions under which impregnation is carried out are such as to substantially improve the cracking characteristics of the catalyst, upon subsequent steam treatment, as indicated by an increase in the gasoline to coke ratio. It will be understood that the amount of alumina impregnated on the catalyst is desirably such as to overcome the poisoning effects of the nickel contaminant. Without being limited by any theory, it is postulated that the nickel poison may be rendered inactive by combination with the alumina and that subsequent steam treatment mobilizes this reaction, thereby enhancing the conversion of nickel from a poisonous to a non-poisonous state. This postulation finds support in the fact that the nickel content of the catalyst is not diminished by the present treatment and, further, in that subsequent steam treatment of the alumina-impregnated catalyst effects a marked increase in the cracking efficiency of such catalyst. It is to be understood that the amount of alumina deposited on the nickel-poisoned catalyst cannot be defined strictly but, rather, is of such quantity as to bring about, after steam treatment of the catalyst, a substantial improvement in the cracking efficiency of the catalyst, as indicated by an increase in the gasoline to coke ratio. Generally the amount of alumina deposited on the nickel-poisoned catalyst in accordance with the present process is a small amount, less than about 5 percent by weight of the catalyst.

The aluminum compound used for impregnating is one which will decompose and leave a residue of alumina upon subsequent calcination of the catalyst. The impregnation may be effected with a solution of such compound in an appropriate solvent or the poisoned catalyst may be contacted with vapors of a suitable aluminum compound, such as aluminum chloride. When aqueous solutions of the aluminum compound are employed, the compound is generally an inorganic salt such as aluminum nitrate, aluminum chloride, aluminum sulfate, and the like. On the other hand, if the aluminum compound is added to the petroleum charge stock, it should be oil-soluble, and consequently organic aluminum compounds will generally be employed under such conditions. Suitable compounds for such method of operation include aluminum naphthenate, aluminum oxylate, complex aluminum cyanides, aluminum alcoholates, and the like.

After impregnation, the catalyst is dried, calcined at an elevated temperature sufficient to effect deposition of alumina on the catalyst and the catalyst is then subjected to a mild steam treatment. If desired, the catalyst may be treated with a precipitant for aluminum hydroxide, such as a hydroxide of an alkali metal or ammonium hydroxide, and then water-washed either immediately prior or immediately subsequent to the drying step after the above impregnation. The exposure of the previously alumina-impregnated catalyst to steam is a necessary step in the present reactivation procedure. Steam treatment may be carried out at a temperature within the approximate range of 800° F. to 1500° F. for at least about 2 hours. Usually steam at a temperature of about 1000° F. to 1300° F. will be used, with the treating period extending from about 2 to about 48 hours. Temperatures above 1500° F., and generally above 1300° F. for the clay catalysts, may be detrimental and should be avoided. As long as catalytically high temperatures, which cause rapid shrinkage or sintering of the catalyst, are avoided, longer periods of treatment than above designated apparently have no adverse effect. Also, an atmosphere consisting of a substantial amount of steam, say, at least about 10 percent by volume, but containing air or other gas substantially inert with respect to the composite being treated, may be used and such mixtures are, in fact, desirable with the use of the more elevated temperatures to avoid possible deactivation of the catalyst.

After the above-described impregnation and steam treatment, the catalyst is in a reactivated state and may be introduced or returned to the conversion chamber of the cracking unit for further use in catalytically promoting the conversion of higher boiling hydrocarbons to hydrocarbons boiling in the range of gasoline.

The following example will serve to illustrate the process of the invention without limiting the same:

EXAMPLE 1

A siliceous gel cracking catalyst containing about 90.85 percent $SiO_2$, 9 percent $Al_2O_3$, and 0.15 percent $Cr_2O_3$, and contaimnated with about 345 p. p. m. of nickel was tested in the standard CAT-A activity test. The product gave a high coke yield and a low gasoline to coke ratio.

The above catalyst was then impregnated with approximately 2 percent by weight of alumina. Impregnation was carried out by contacting 195 grams of the poisoned catalyst with 250 cc. of aqueous aluminum nitrate containing 87.7 grams of $Al(NO_3)_3 \cdot 9H_2O$ for a period of about 1 hour. The catalyst was then centrifuged, dried, calcined at 1000° F., steam-treated, and then evaluated in the standard CAT-A activity test. The data are summarized in the table below:

Table 1

| Catalyst and treatment | Cat-A data ||||||| Gasoline/coke |
| --- | --- | --- | --- | --- | --- | --- | --- |
| | Ni, p. p. m. | Bulk density | Gas gravity | Gas, percent weight | Coke, percent weight | Gasoline (vol. percent at 410° F.) | |
| Poisoned catalyst [1] | 345 | 0.75 | 0.84 | 12.0 | 6.3 | 30.0 | 4.8 |
| Poisoned catalyst +2% $Al_2O_3$+ steam treatment [2] | 345 | 0.85 | 1.55 | 7.4 | 2.1 | 37.0 | 17.6 |

[1] Catalyst heated in air 3 hours at 1100° F.
[2] Catalyst steam-treated 10 hours at 1200° F. in 100% steam.

It will be noted from the above data that, when the nickel-poisoned catalyst is impregnated with alumina and thereafter steam-treated, there is a decided rise in the gasoline/coke ratio. Simultaneously, a substantial rise in the gas gravity and a reduction in the gas make are effected. These facts indicate a measurable reduction in the cracking to highly undesirable light gases. In addition, and of even more importance, the coke laid down is reduced to an unexpected degree. Also, the percent volume of gasoline produced is increased to afford a marked improvement in gasoline to coke ratio.

EXAMPLE 2

A siliceous gel cracking catalyst similar to that described in Example 1, but contaminated with about 350 p. p. m. of nickel, was tested, after steam treatment, in the standard CAT–A activity test. The product gave a high coke yield.

Three samples of the above steam-treated material were then impregnated, respectively, with about 0.5 percent, 1.0 percent, and 2.0 percent by weight of $Al_2O_3$ by adsorption from an aqueous aluminum nitrate solution, at room temperature. The impregnated samples were then dried, calcined at 1000° F., steam-treated and then evaluated in the standard CAT–A activity test. The data are summarized in the table below:

Table II

| Catalyst and treatment | Cat-A data ||||||| Gasoline/coke |
| --- | --- | --- | --- | --- | --- | --- | --- |
| | Ni, p. p. m. | Bulk density | Gas gravity | Gas, percent weight | Coke, percent weight | Gasoline (vol. percent at 410° F.) | |
| Poisoned catalyst [1] | 350 | 0.80 | 1.15 | 7.8 | 2.6 | 30.5 | 11.7 |
| Poisoned catalyst +0.5% $Al_2O_3$+ steam treatment [1] | 350 | 0.81 | 1.45 | 6.5 | 1.9 | 31.0 | 16.3 |
| Poisoned catalyst +1.0% $Al_2O_3$+ steam treatment [1] | 350 | 0.81 | 1.46 | 6.1 | 1.9 | 33.2 | 17.5 |
| Poisoned catalyst +2.0% $Al_2O_3$+ steam treatment [1] | 350 | 0.83 | 1.44 | 6.4 | 1.7 | 31.9 | 18.8 |

[1] Catalyst steam-treated 10 hours at 1200° F. in 100% steam.

From the above data, it will be seen that impregnation of the poisoned catalyst with alumina, followed by steam treatment, brought about a marked increase in the gasoline to coke ratio of the catalyst and, further, that such increase was effected without the necessity of removing the nickel poison.

It is to be understood that the above description is merely illustrative of preferred embodiments of the invention. While such description has been directed particularly to the reactivation of nickel-poisoned siliceous cracking catalysts, it is contemplated that the method set forth may likewise be applicable for reactivation of various other catalytic composites which have become poisoned by the presence therein of metal contaminants, such as copper, iron, vanadium, and the like.

I claim:
1. A method for treating a nickel-poisoned siliceous alumina containing hydrocarbon conversion catalyst, which comprises impregnating the poisoned catalyst with an amount of alumina not exceeding about 5 percent by weight, by bringing said poisoned catalyst into contact with an aluminum compound decomposable upon calcination to alumina, calcining and thereafter subjecting the alumina-impregnated catalyst to steam-treatment at a temperature in the range of about 800 to about 1500° F. for at least about 2 hours.

2. A method for overcoming the poisoning effects of nickel contaminant in a siliceous alumina containing cracking catalyst, which comprises impregnating said catalyst with an amount of alumina not exceeding about 5 percent by weight, by bringing said catalyst into contact with a solution of an aluminum compound decomposable upon calcining to alumina and thereafter calcining and steam-treating the catalyst at a temperature in the range of about 1000 to about 1300° F. for a period of between about 2 and about 48 hours.

3. A method for treating a nickel-poisoned siliceous alumina containing cracking catalyst, which comprises impregnating said catalyst with alumina by contacting with a solution of an aluminum compound, which compound decomposes to leave a residue of alumina upon subsequent calcination of the catalyst, removing the catalyst from contact with said solution, calcining the same, and subjecting the calcined catalyst to steam-treatment at a temperature in the range of about 800 to about 1500° F. for at least about 2 hours.

4. A method for reactivating a siliceous alumina containing cracking catalyst which has been poisoned by a small contaminating amount, less than about 0.20 percent by weight, of nickel during the conversion of high boiling petroleum hydrocarbons to hydrocarbons boiling in the gasoline range, which comprises impregnating said poisoned catalyst with alumina by contacting with a solution of an aluminum compound capable of thermal decomposition to alumina, removing the catalyst from contact with said solution, calcining the catalyst to effect the aforesaid thermal decomposition, and subjecting the treated catalyst to steam-treatment at a temperature in the range of about 1000 to about 1300° F. for a period of between about 2 and about 48 hours.

5. A method for treating a poisoned siliceous alumina containing cracking catalyst contaminated by a small amount, less than about 0.20 percent by weight, of nickel, which comprises impregnating said catalyst with an aluminum compound which, upon calcination of the catalyst, forms a small amount, less than about 5 percent by weight, of alumina, calcining the impregnated catalyst, and subjecting the calcined catalyst to steam-treatment at a temperature in the range of about 800 to about 1500° F. for at least about 2 hours.

6. A method for treating a nickel-poisoned silica-alumina hydrocarbon conversion catalyst, which comprises impregnating the poisoned catalyst with an amount of alumina not exceeding about 5 percent by weight, by bringing said poisoned catalyst into contact with an aluminum compound decomposable upon calcination to alumina, calcining and thereafter subjecting the alumina-impregnated catalyst to steam-treatment at a temperature in the range of about 800 to about 1500° F. for at least about 2 hours.

References Cited in the file of this patent

UNITED STATES PATENTS

| | | |
|---|---|---|
| 2,440,756 | Oulton | May 4, 1948 |
| 2,480,627 | Bodkin et al. | Aug. 30, 1949 |
| 2,579,123 | Pardee | Dec. 18, 1951 |
| 2,651,617 | Schmerling | Sept. 8, 1953 |
| 2,668,798 | Plank | Feb. 9, 1954 |
| 2,764,557 | Doherty et al. | Sept. 25, 1956 |